(12) United States Patent
Muppirala et al.

(10) Patent No.: US 9,325,583 B2
(45) Date of Patent: Apr. 26, 2016

(54) METHOD AND SYSTEM FOR OPTIMIZING NETWORK INPUT/OUTPUT PERFORMANCE

(75) Inventors: Kishore Kumar Muppirala, Karnataka (IN); Narayanan Ananthakrishnan Nellayi, Karnataka (IN); Vijay Vishwanath Hegde, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1242 days.

(21) Appl. No.: 12/401,619

(22) Filed: Mar. 11, 2009

(65) Prior Publication Data

US 2010/0191876 A1 Jul. 29, 2010

(30) Foreign Application Priority Data

Jan. 27, 2009 (IN) .............................. 175/CHE/2009

(51) Int. Cl.
*G06F 3/00* (2006.01)
*G06F 5/00* (2006.01)
*H04L 12/24* (2006.01)
*G06F 3/06* (2006.01)

(52) U.S. Cl.
CPC ............ *H04L 41/5009* (2013.01); *G06F 3/067* (2013.01); *G06F 3/0613* (2013.01); *G06F 3/0656* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 6,170,042 B1 * | 1/2001 | Gaertner et al. | 711/158 |
| 6,502,106 B1 * | 12/2002 | Gampper et al. | 709/202 |
| 6,553,476 B1 * | 4/2003 | Ayaki et al. | 711/204 |
| 7,054,790 B1 * | 5/2006 | Rich | 702/186 |
| 7,363,399 B2 * | 4/2008 | Shum et al. | 710/52 |
| 7,739,470 B1 * | 6/2010 | Norgren | 711/168 |
| 2001/0047462 A1 * | 11/2001 | Dimitroff et al. | 711/162 |
| 2004/0078185 A1 * | 4/2004 | Briggs et al. | 703/24 |
| 2004/0133707 A1 * | 7/2004 | Yoshiya et al. | 710/6 |
| 2007/0078981 A1 * | 4/2007 | Alberth et al. | 709/225 |
| 2007/0208849 A1 * | 9/2007 | Ely et al. | 709/224 |
| 2008/0168452 A1 * | 7/2008 | Molaro et al. | 718/103 |

* cited by examiner

*Primary Examiner* — Elias Mamo
(74) *Attorney, Agent, or Firm* — Global IP Services, PLLC

(57) ABSTRACT

A method and system for optimizing network I/O throughput is disclosed. In one embodiment, a method for optimizing an input/output (I/O) throughput for a storage network comprises measuring a service time for a storage device of the storage network in completing an I/O request serviced by a storage driver. The method also comprises determining a status of an I/O performance between the storage driver and the storage device by comparing the service time with an expected service time for the storage device in completing the I/O request, where the expected service time is calculated based on a type of the storage device and a size of the I/O request. The method further comprises adjusting a maximum queue depth associated with the storage device based on the status of the I/O performance.

14 Claims, 5 Drawing Sheets

METHOD AND SYSTEM FOR OPTIMIZING NETWORK INPUT/OUTPUT PERFORMANCE

RELATED APPLICATIONS

Benefit is claimed under 35 U.S.C. 119(a)-(d) to Foreign application Serial No. 175/CHE/2009 entitled "METHOD AND SYSTEM FOR OPTIMIZING NETWORK INPUT/OUTPUT PERFORMANCE" by Hewlett-Packard Development Company, L.P., filed on 27$^{th}$ January, 2009, which is herein incorporated in its entirety by reference for all purposes.

BACKGROUND

In a storage network comprising multiple hosts and a disk array, a disk driver is a computer program which allows one or more applications accessing a host to interact with a disk in the disk array. The disk driver typically communicates with the disk through a computer bus or communications subsystem to which the disk is connected. When an application invokes one or more input/output (I/O) requests to the driver, the disk driver issues respective commands to the disk. Once the disk sends data back to the disk driver, the disk driver may invoke routines in the original application program.

A queue may be used to deal with multiple I/O requests in the host side as well as the disk array side. On the host side, multiple I/O requests from one or more applications may wait in a queue coupled to the disk driver until the disk driver is ready to service them. On the disk array side, many I/O requests from one or more hosts may wait in a queue coupled to each disk (e.g., or port) of the array to execute the I/O requests in order. Here, a maximum queue depth may refer to the maximum number of the I/O requests or commands which can be concurrently issued by the disk driver, where not all of the I/O requests may be serviced or responded by the disk.

In the industry, it is common practice to configure the maximum queue depth before a host device, such as a server, is delivered to a customer. However, the configuration may be done without considering the type or capability of the disk device(s) the host is connected to. Accordingly, if the maximum queue depth is too big for the customer's use, it may cause the disk driver to issue too many I/O requests, thus resulting in slowing down or termination of the I/O process. On the other hand, if the maximum queue depth is too small, the disk driver may issue too few I/O requests at a time, thus resulting in lower throughput and inefficient usage of the disk device. Furthermore, when too many I/O requests from multiple hosts are concurrently forwarded to the queue for the same disk of the storage array, a "queue full" condition may occur at the device side of the queue. In such a case, a host may have to retransmit the I/O requests which have been rejected, thus significantly reducing the I/O throughput of the storage network.

BRIEF DESCRIPTION OF THE DRAWINGS

Embodiments of the present invention are illustrated by way of an example and not limited to the FIGs. of the accompanying drawings, in which like references indicate similar elements and in which.

Other features of the present embodiments will be apparent from the accompanying drawings and from the detailed description that follows.

DETAILED DESCRIPTION

A method and system for optimizing network I/O throughput is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
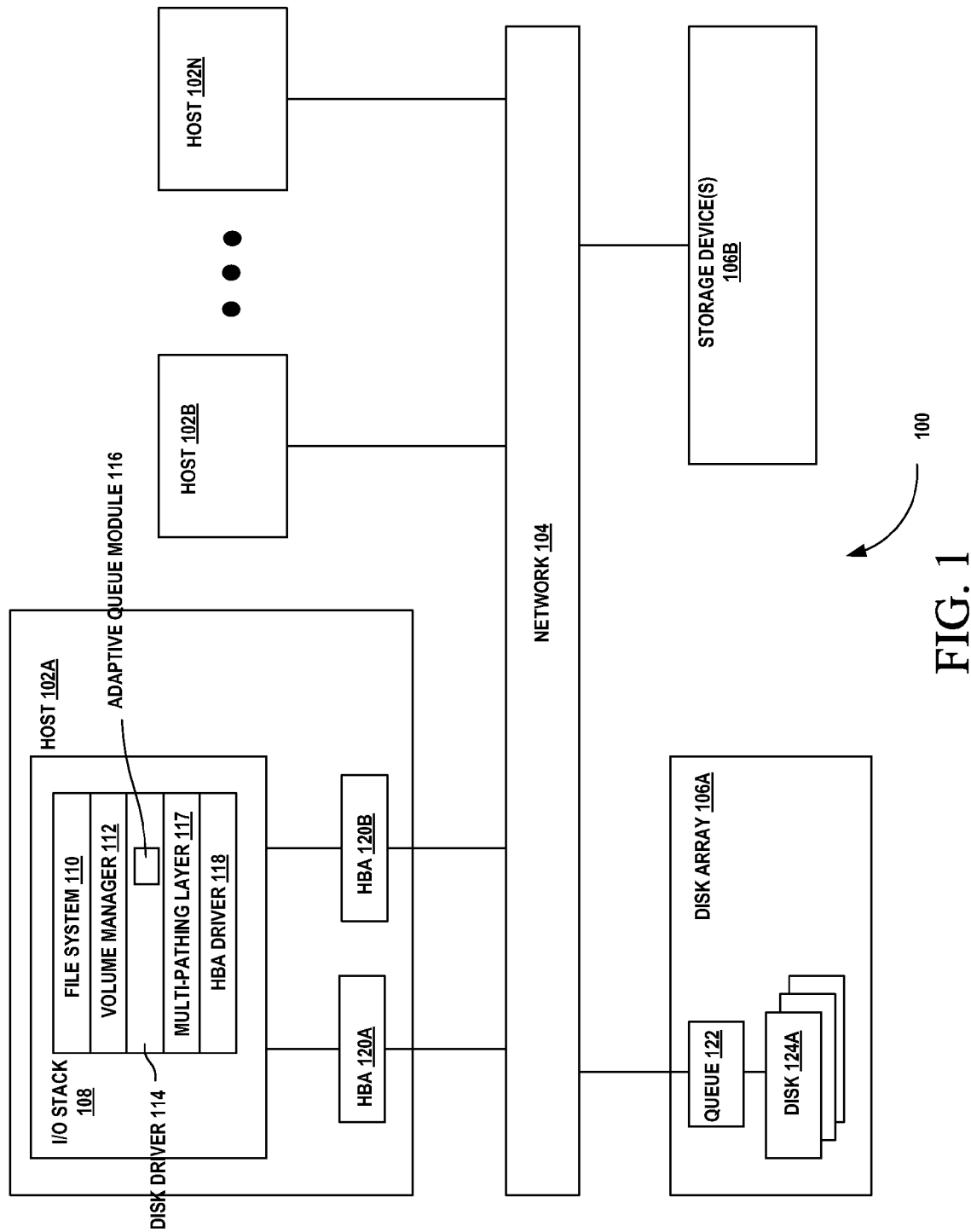
FIG. 1 is an exemplary storage network system with an adaptive queue module, according to one embodiment.

FIG. 1 is an exemplary storage network system 100 with an adaptive queue module 116, according to one embodiment. In FIG. 1, the storage network system 100 comprises multiple hosts 102A-N (e.g., servers), a network 104, and two storage devices 106A and 106B. The host 102A comprises an I/O stack 108 and two host bus adapters (HBAs) 120A and 120B. As illustrated in FIG. 1, the I/O stack 108 comprises a file system 110, a volume manager 112, a disk driver 114, a multi-pathing layer 117, and a HBA driver 118 in multiple layers.

The file system 110, which sits on top of the volume manager 112, stores and organizes computer files and the data so as to make it easy to find and access them. The volume manager 112 may allocate space on the two storage devices 106A and 106B by concatenating, striping together or otherwise combining partitions into larger virtual ones that can be resized or moved while the storage devices 106A and 106B are used. Underneath the layer of the volume manager 112, an aggregate of multiple instances of disk driver (e.g., the disk driver 114) may reside. The disk driver 114 allows one or more applications (not shown in FIG. 1) coupled to the host 102A to interact with a storage device (e.g., a disk 124A) of the disk array 106A. The disk driver 114 may communicate with the disk 124A through a bus or communications subsystem to which the disk is connected through one or more HBAs (HBAs 120A, 120B, etc.). When a calling program invokes a routine in the disk driver 114, the disk driver 114 issues commands (e.g., read, write, etc.) to the disk 124A. Once the disk 124A sends data back to the disk driver 114, the disk driver 114 may invoke routines in the original calling program. The disk driver 114 may be hardware-dependent (e.g., the disk 124A) and operating-system-specific.

The multi-pathing layer 117 figures out if there are multiple paths to a particular storage device (e.g., the disk 124A) in terms of multiple hardware adapters (e.g., the HBA 120A, the HBA 120B, etc.), in terms of multiple switches, which may reside in the network 104, or multiple controllers on the storage device. The multi-pathing layer 117 may aggregate all these paths and provides an optimal path to the storage device.

It is appreciated that the multi-pathing layer 117 can be embedded or included within the layer of the disk driver 114. Below the multi-pathing layer 117, an interface driver (e.g., the HBA driver 118) manages an interface card (e.g., the HBA 120A or the HBA card 120B, which could be operating at different data transfer speeds).

Then, the HBA 120A and the HBA 120B are used to connect the host 102A to the network 104 (e.g., switches) via cables. Then, cables run between the network 104 and the disk array 106A and the storage device(s) 106B. It is appreciated that the network 104 can be any one of a storage area network (SAN), a network attached storage (NAS), and a direct attached storage (DAS). As illustrated in FIG. 1, I/O requests from multiple hosts (e.g., the host 102A, the host 102B, the host 102N, etc.) are pending in a queue 122 coupled to the disk 124A until they are processed by the disk 124A. It is appreciated that the type of the disk array 106A may be different type than the type of the storage device(s) 106B. As a result, the data processing speed may be different between the disk array 106A and the storage device(s) 106B.

In one embodiment, the disk driver 114 may comprise the adaptive queue module 116 which adjusts a maximum queue depth (which is not shown in FIG. 1) associated with the disk driver 114 by measuring a service time for the disk 124A in completing an I/O request serviced by the disk driver 114 and by comparing the service time with an expected service time for the storage device in completing such an I/O request. Accordingly, by adjusting the maximum queue depth via continuous monitoring of the I/O performance status, slowing down or termination of the I/O process due to too many pending I/O requests (e.g., as a result of too long a queue) or inefficiency resulting from too few pending I/O processes (e.g., as a result of too short a queue) can be avoided. This proactive "tuning" of the size of the queue may also help to avoid a "queue full" condition which significantly contributes toward the reduction of the I/O throughput in the storage network system 100.

It is appreciated that the adaptive queue module 116 illustrated in FIG. 1 may be implemented for other device drivers (e.g., for peripheral devices such as a printer, scanner, video, etc.) such that the throughput extracted or achieved between the host (e.g., PC, laptop, etc.) and the peripheral device may be improved by adjusting the maximum queue depth for the device for servicing multiple requests or commands from a number of application programs residing in the host. It is also appreciated that the adaptive queue module 116 may be implemented in any layer of the I/O stack 108. It is further appreciated that the adaptive queue module 116 may be implemented to improve I/O performance of any type of storage devices (e.g., virtual, logical, physical, etc.), which include but not limited to a tape storage, a disk storage, a magnetic bubble memory, and a solid state semiconductor memory.

Figure 2:
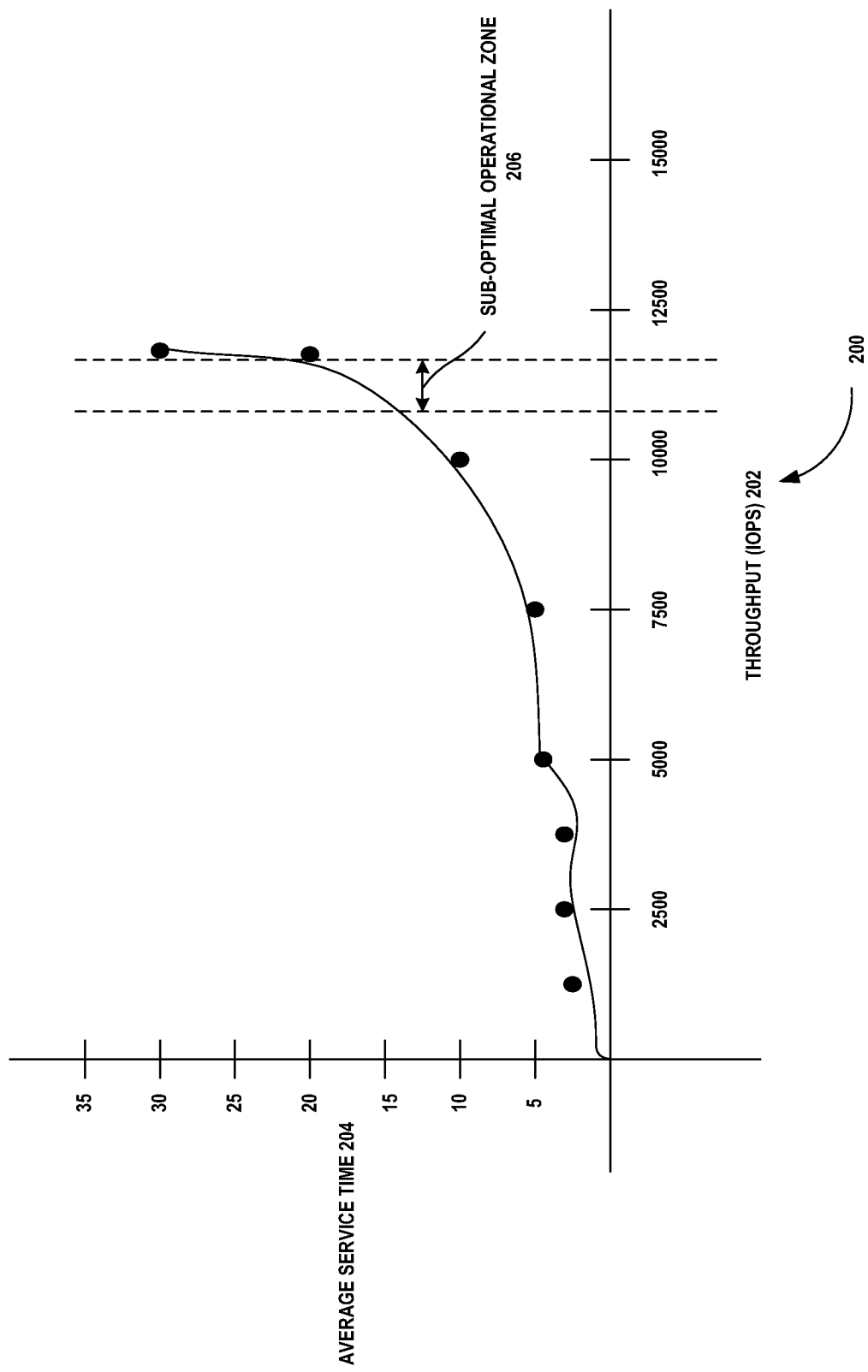
FIG. 2 is an exemplary graph for illustrating average service times taken for processing various numbers of I/O operations per second, according to one embodiment.

FIG. 2 is an exemplary graph 200 for illustrating average service times taken for processing various numbers of I/O operations per second (IOPS), according to one embodiment. FIG. 2 illustrates the performance of a storage device in completing I/O requests per second (IOPS) 202 serviced by a disk driver. From FIG. 2, the curve formed by corresponding average service times taken by processing different numbers of IOPS 202 has a significant "knee" or upshoot. The knee pushes the device or its corresponding host in the storage network into a sub-optimal zone 206, which results in reduced performance of the device or the host. The knee may be followed by a "queue-full" condition which results in a failure of I/O requests and retransmission of the I/O requests, thus further slowing down the I/O performance.

In order to rectify the slow down of I/O performance by the device, the adaptive queue module 116 of FIG. 1 may be implemented in the host 102A, thus avoiding the device getting into the sub-optimal zone 206. As will be illustrated in details in FIG. 3 and FIG. 4, the maximum number of requests which can be issued by the disk driver 114 of FIG. 1 (e.g., the maximum queue depth for the disk device with which the disk driver 114 interacts) can be adjusted (e.g., on an ongoing basis) based on monitoring of the I/O performance/responsiveness of the storage network (e.g., between the disk driver 114 and the disk 124A). Thus, the maximum queue depth can be controlled in tune with the instant processing condition of the storage network.

Figure 3:
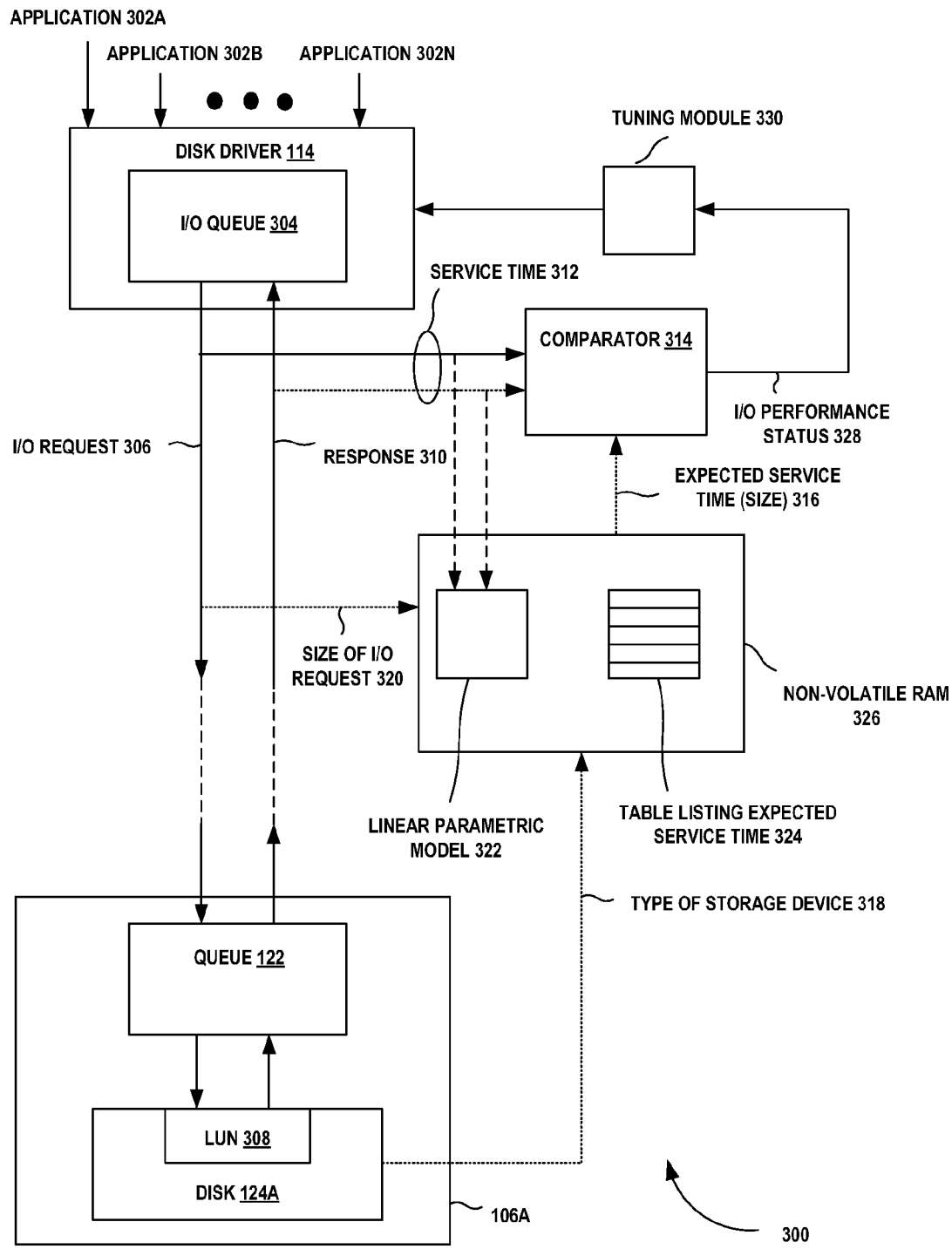
FIG. 3 is a block diagram illustrating an exemplary process for optimizing an I/O performance of a storage network, according to one embodiment.

FIG. 3 is a block diagram 300 illustrating an exemplary process for optimizing an I/O performance of a storage network, according to one embodiment. In FIG. 3, multiple I/O requests may be invoked by one or more applications 302A-N coupled to the disk driver 114 of the host 102A in FIG. 1. The pending I/O requests may be queued in an I/O queue 304 for the disk driver 114. Then, one or more I/O request (e.g., an I/O request 306) may be forwarded to the disk array 106A via the storage network (e.g., the network 104). Multiple I/O requests from one or more hosts (e.g., the host 102A, the host 102B, the host 102N, etc.) may be pending in the queue 122 for the disk 124A until they are executed by the disk 124A. In one embodiment, a logical unit number 308 of the disk 124A may be used to address the disk 124A (e.g., by the disk driver 114).

Once the disk 124A processes the I/O request 306, it may forward a response 310 back to the disk driver 114 (e.g., with accompanying data). In one embodiment, a service time 312 consumed by the disk 124A for responding to the I/O request 306 may be monitored (e.g., measured). Once the service time 312 is obtained, it may be compared with an expected service time 316 for a typical I/O request which is similar in size with the I/O request 306 and which accesses a same type of device as the disk 124A to determine an I/O performance status 328 between the disk driver 114 and the disk 124A. In one embodiment, the I/O performance status 328 is used to adjust the maximum queue depth for the disk 124A and/or to control the number of I/O requests that can be concurrently issued by the disk driver 114.

In one embodiment, the expected service time 316 may be obtained using a table listing expected service time 324 according to a size of I/O request 320 and a type of storage device 318 being accessed. Thus, typical or expected service times for I/O requests of different I/O sizes (e.g., 1 KB, 2 KB, 4 KB, etc.) and/or for different device types can be maintained in a persistent, yet updatable repository, such as a non-volatile random access memory (RAM) 326. As illustrated in FIG. 3, the size of I/O request 320 may be accessed by tapping the I/O request 306, and the type of storage device 318 may be obtained by accessing information from the disk 124A.

In another embodiment, a mathematical approximation technique, such as a linear parametric model 322, may be used to extrapolate the expected service time. In one exemplary embodiment, the parametric model for the disk 124A that can be accessed by the disk driver (e.g., the adaptive queue module 116 or a comparator 314) may be built or generated. For instance, the expected service time 316 can be modeled as "y=ax+b," where "y" is the expected service time 316, "a" is related to the byte transfer rate of the link connecting the host 102A to the disk 124A, "x" is the number of bytes (e.g., the size of I/O request 320) in the IO request 306, and "b" is the set-up time for the request. In one embodiment, the disk driver 114 of the host 102A may compute "a" and "b" during the initial phase of its operation. It is appreciated that the mathematical approximation technique can include other types of mathematical models, such as a quadratic model, a geometric model, and so on.

With the expected service time obtained for the type of storage device 318 and the size of the I/O request 320, the comparator 314 is used to generate the I/O performance status 328 (e.g., too slow service time, too fast service time, etc.). As will be illustrated in detail in FIG. 4, based on the comparison of the service time 312 and the expected service time 316, the I/O performance status 328 may fall in one of three states, such as slowing down of I/O service time (e.g., due to too many pending I/O requests), idling of the disk 124A (e.g., I/O service time being much less due to too few pending I/O requests), or normalcy. Based on the I/O performance status 328, a tuning module 330 may tune the size of the I/O queue 304 to control the I/O service time such that it minimizes the link from experiencing a "queue-full" condition or a long response time from the device.

Figure 4:
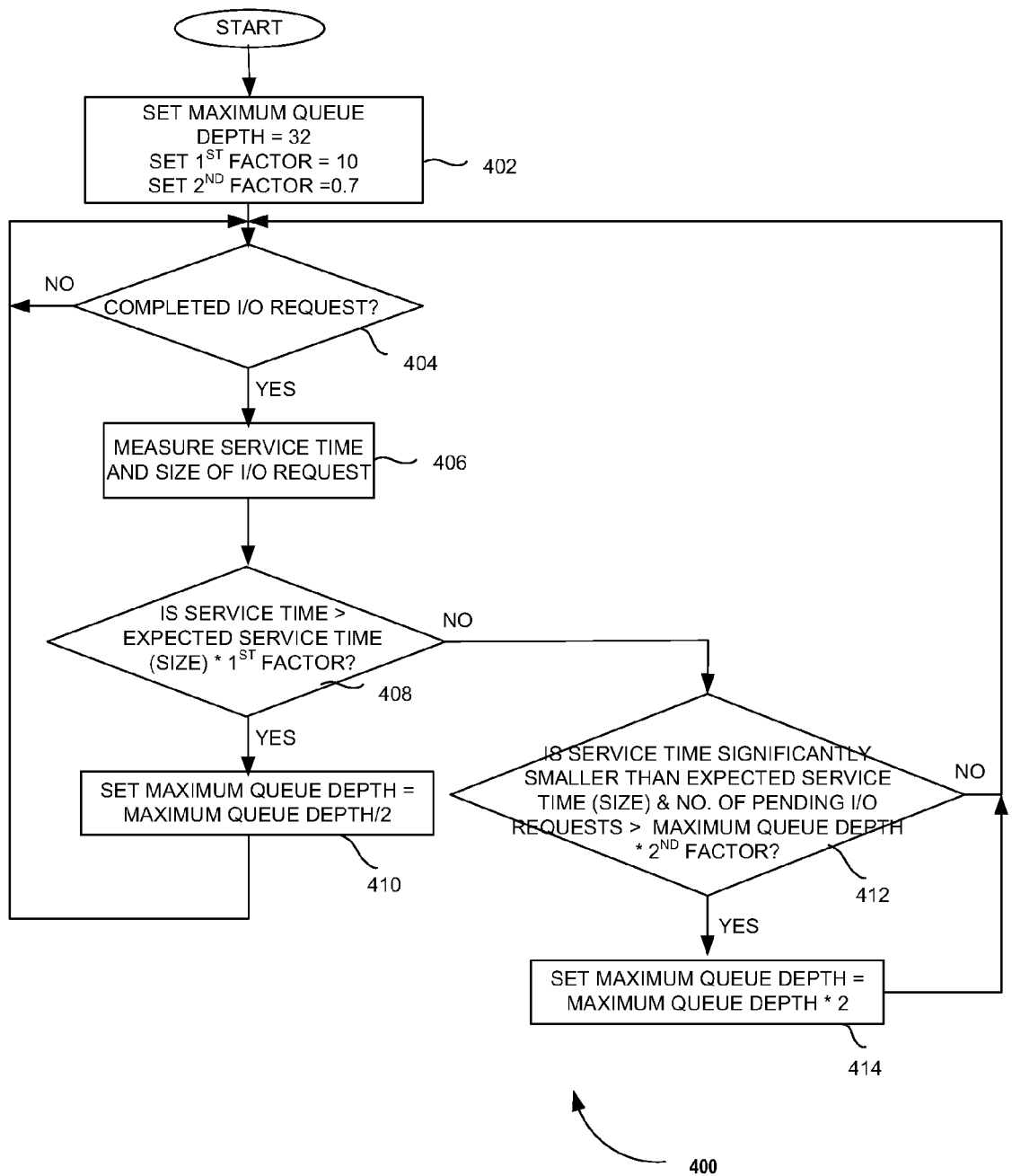
FIG. 4 is a flow chart for an exemplary method for optimizing an I/O performance of a storage network, according to one embodiment.

FIG. 4 is a flow chart for an exemplary method for optimizing an I/O performance of a storage network, according to one embodiment. It is appreciated that the method illustrated in FIG. 4 is an exemplary embodiment of the storage network system 100 in FIG. 1 and/or the exemplary process of optimizing an I/O throughput of a storage network in FIG. 3. In operation 402, a maximum queue depth is set at 32, a first factor is set at 10, and a second factor is set at 0.7. In operation 404, it is checked whether there is any I/O request completed by a storage device. If not, this query is maintained until there is an I/O request completed. If yes, then the service time and size of the I/O request are measured in operation 406.

Then, in operation 408, the service time is compared with the expected service time (e.g., which can be obtained using one of the two methods illustrated in FIG. 3) multiplied by the first factor. If the service time is greater than the expected service time multiplied by the first factor, which indicates that the I/O throughput is relatively small, the maximum queue depth is adjusted to half of the instant maximum queue depth in operation 410. As a result, the size of pending I/O requests which contributes to the slowing down of the traffic via the link may be reduced. If the service time is much less than the expected service time and the size of pending I/O request is greater than the maximum queue depth multiplied by the second factor in operation 412, then the maximum queue depth is adjusted to twice of the instant maximum queue depth in operation 414. As a result, the size of pending I/O requests, which may be too few in number, is increased. It is appreciated that operations 402 through 414 may be continuously performed to adapt the maximum queue depth in an ongoing basis, thus maintaining an optimal level of the I/O throughput for the link or storage network. The below is a pseudo code which illustrates the exemplary flow chart of FIG. 4:

```
begin
    expected response time = x (i); /*where x(1) = expected service time
            for data size of 1 KB, x(2) = expected service time
    for
            data size of 2 KB, etc.*/
    maximum queue depth = 32; /*any legal value, specified by the system
            administrator or system default*/
    first factor = 10; / If the I/O turn-around-time from the device exceeds
    this factor,
        the responsiveness is considered deteriorated and the
        maximum queue depth is cut to throttle the I/Os*/
    second factor = 0.7; /*The ratio of the number of pending I/O requests
        instant maximum queue depth beyond which, if the
        to the responsiveness is good, the maximum queue depth is
        doubled*/
    pending I/O requests = current pending queue length;
    for (all completed I/O requests) do
        measure service time of a I/O request of size y bytes; /* "y" is the
        size of
                the completed I/O request*/
        i = log$_2$y + 1 − 10; /*round to nearest power of 2*/
        if (i > 0) then
            if (service time > expected service time (i) * first factor) then
                /*the device is taking longer to respond, let us slow-
    down*/
                the maximum queue depth = the maximum queue
    depth/2;
            else if (service time << expected service time (i) & pending
    request
                the maximum queue depth* second factor) then
                the maximum queue depth = the maximum queue
                depth*2
                /* '<<' above indicates "much smaller than" (e.g., < 0.2
                times) indicating underload of the device*/
            endif
        endif
    endfor
end
```

Figure 5:
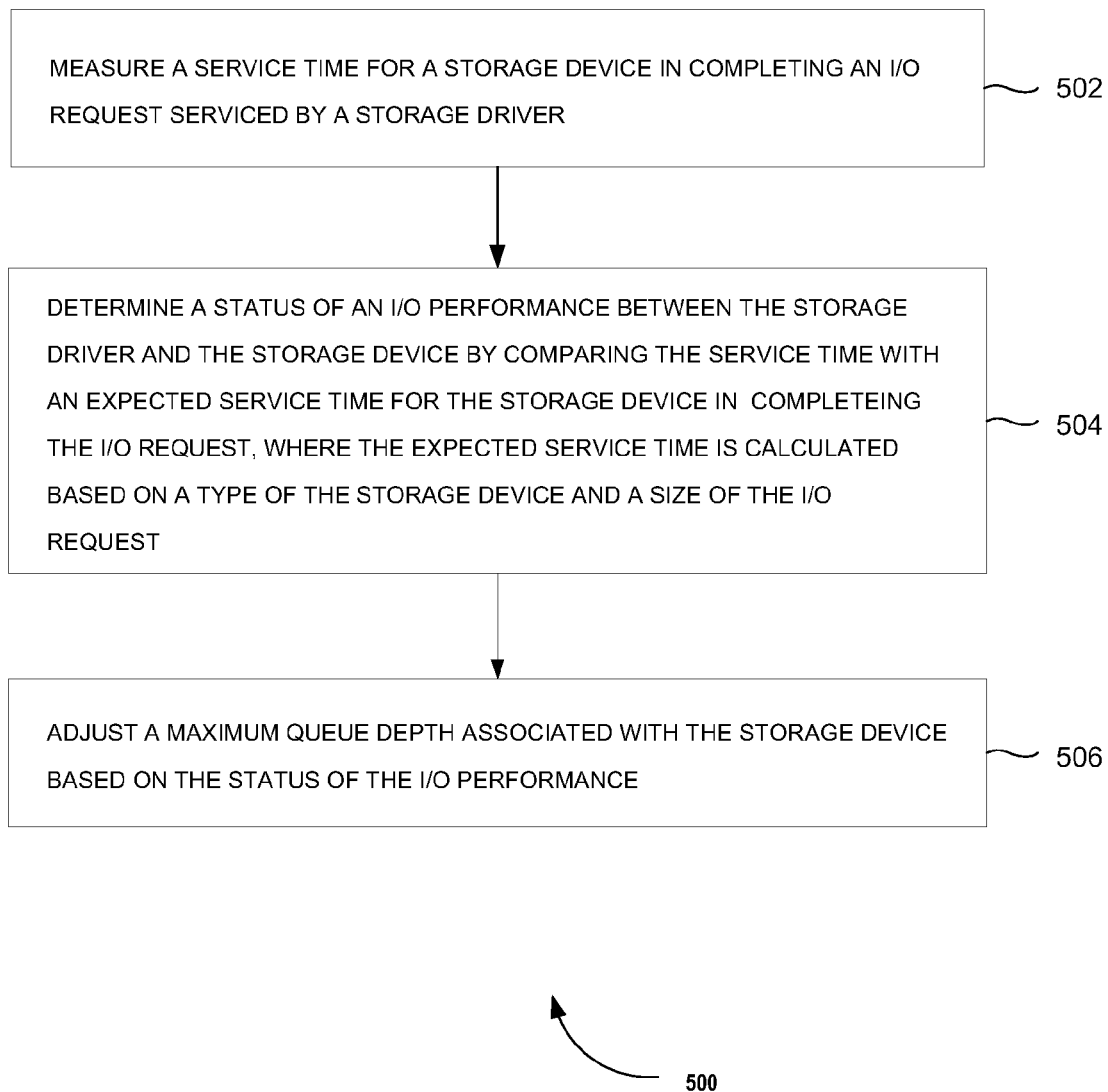
FIG. 5 is a process flow chart for an exemplary method for optimizing an I/O performance of a storage network, according to one embodiment.

FIG. 5 is a process flow chart 500 for an exemplary method for optimizing an I/O performance of a storage network, according to one embodiment. In operation 502, a service time for a storage device of a storage network in completing an I/O request serviced by a storage driver is measured. In one embodiment, the storage driver may be an element of an I/O stack of a host among multiple hosts in the storage network, and the storage device may be a tape storage, a disk storage, a magnetic bubble storage, a solid state semiconductor memory, and so on.

In operation 504, a status of an I/O performance between the storage driver and the storage device is determined by comparing the service time with an expected service time for the storage device in completing the I/O request, where the expected service time is calculated based on a type of the storage device and size of the I/O request. In one embodiment, the expected service time is stored in a non-volatile RAM coupled to the storage driver. In one exemplary implementation, the expected service time is generated by using a mathematic approximation technique, such as a linear parametric model, which sets the expected service time equal to a byte transfer rate between the storage driver and the storage device multiplied by a number of bytes in the I/O request compensated by a set-up time for the I/O request. It is appreciated that the byte transfer rate between the storage driver and the storage device and the set-up time for the I/O request are generated during an initial phase of I/O operations between the storage driver and the storage device. In addition, the status of the I/O performance may comprise a too slow service time and a too fast service time.

In operation 506, a maximum queue depth associated with the storage device, henceforth the storage driver, is adjusted based on the status of the I/O performance. In one embodiment, the maximum queue depth may be decreased (e.g., by half) if the service time is greater than the expected service time value multiplied by a first factor (e.g., 10). In alternative embodiment, the maximum queue depth may be increased if the service time is significantly less than the expected service time and if the number of pending I/O requests in the I/O queue is greater than the maximum queue depth multiplied by a second factor (e.g., 0.7).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for optimizing an input/output (I/O) performance for a storage network, comprising:
   measuring a service time for a storage device in completing an I/O request serviced by a storage driver;
   determining a status of an I/O performance between the storage driver and the storage device by comparing the service time with an expected service time for the storage device in completing the I/O request, wherein the expected service time is calculated based on a type of the storage device and a size in number of bytes of the I/O request; and
   using the status of the I/O performance to adjust a maximum queue depth associated with the storage device and to control subsequent I/O requests concurrently issued by the storage driver, comprising decreasing the maximum queue depth if the service time is greater than the expected service time multiplied by a first factor.

2. The method of claim 1, wherein the storage driver is an element of an I/O stack of a host among a plurality of hosts in the storage network.

3. The method of claim 1, wherein the storage device comprises a tape storage, a disk storage, a magnetic bubble memory, and a solid state semiconductor memory.

4. The method of claim 1, wherein the expected service time is stored in a non-volatile random access memory (RAM) coupled to the storage driver.

5. The method of claim 1, wherein the expected service time is generated by using a mathematical approximation technique which sets the expected service time equal to a byte transfer rate between the storage driver and the storage device multiplied by the number of bytes in the I/O request compensated by a set-up time for the I/O request.

6. The method of claim 5, wherein the byte transfer rate between the storage driver and the storage device and the set-up time for the I/O request are generated during an initial phase of I/O operations between the storage driver and the storage device.

7. The method of claim 1, wherein the status of the I/O performance comprises a too slow service time and a too fast service time in completing the I/O request.

8. The method of claim 1, wherein the using the status of the I/O performance to adjust the maximum queue depth further comprises increasing the maximum queue depth if the service time is significantly less than the expected service time and if a number of I/O requests waiting to be issued to the storage device by the storage driver is greater than the maximum queue depth multiplied by a second factor.

9. A host device of a storage network, comprising:
   a storage driver having an adaptive queue module for servicing an I/O request to a storage device of the storage network using an I/O queue, wherein a maximum queue depth of the I/O queue is adjusted and subsequent I/O requests concurrently issued by the storage driver are controlled, by measuring a service time for the storage device in completing the I/O request serviced by the storage driver and by comparing the service time with an expected service time for the storage device in completing the I/O request, wherein the expected service time is calculated based on a type of the storage device and a size in number of bytes of the I/O request, and wherein the maximum queue depth decreases if the service time is greater than the expected service time multiplied by a first factor; and
   a host bus adapter for processing the I/O request between the storage driver and the storage device.

10. The device of claim 9, wherein the storage device comprises a tape storage, a disk storage, a magnetic bubble memory, and a solid state semiconductor memory.

11. The device of claim 10, wherein the storage device is identified by a logical unit number (LUN) of the storage device.

12. The device of claim 9, wherein the expected service time is stored in a non-volatile random access memory (RAM) coupled to the storage driver.

13. The device of claim 9, wherein the expected service time is generated by using a mathematical approximation technique which sets the expected service time equal to a byte transfer rate between the storage driver and the storage device multiplied by the number of bytes in the I/O request compensated by a set-up time for the I/O request.

14. A non-transitory computer readable storage medium for optimizing reboot process of a computer having instructions that, when executed by a computer, cause the computer to perform a method comprising:
   measuring a service time for a storage device in completing an I/O request serviced by a storage driver;
   determining a status of an I/O performance between the storage driver and the storage device by comparing the service time with an expected service time for the storage device in completing the I/O request, wherein the expected service time is calculated based on a type of the storage device and a size in number of bytes of the I/O request; and
   using the status of the I/O performance to adjust a maximum queue depth associated with the storage device and to control subsequent I/O requests concurrently issued by the storage driver, comprising decreasing the maximum queue depth if the service time is greater than the expected service time multiplied by a first factor.

* * * * *